United States Patent
Kurian (10) Patent No.: US 10,917,413 B2
(45) Date of Patent: Feb. 9, 2021

(54) NEURAL MESH PROTECTION SYSTEM FOR DATA TRANSMISSION

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 280 days.

(21) Appl. No.: 16/175,348

(22) Filed: Oct. 30, 2018

(65) Prior Publication Data

US 2020/0137071 A1    Apr. 30, 2020

(51) Int. Cl.
*G06F 7/04* (2006.01)
*H04L 29/06* (2006.01)
*G06F 21/60* (2013.01)

(52) U.S. Cl.
CPC .......... *H04L 63/105* (2013.01); *G06F 21/606* (2013.01); *H04L 63/04* (2013.01); *H04L 63/123* (2013.01)

(58) Field of Classification Search
CPC ..... H04L 63/105; H04L 63/123; H04L 63/04; G06F 21/606
USPC .......................................................... 726/4
See application file for complete search history.

(56) References Cited

U.S. PATENT DOCUMENTS

| | | |
|---|---|---|
| 856,116 A | 6/1907 | Wagner |
| 953,979 A | 4/1910 | Smith |
| 1,002,093 A | 8/1911 | Thaden |
| 6,977,944 B2 | 12/2005 | Brockmann et al. |
| 7,012,893 B2 | 3/2006 | Bahadiroglu |
| 8,565,108 B1 | 10/2013 | Marshall et al. |
| 8,607,322 B2 | 12/2013 | Hinton et al. |
| 8,689,287 B2 | 4/2014 | Bohmer et al. |
| 9,191,381 B1 | 11/2015 | Popp et al. |
| 9,286,465 B1 | 3/2016 | Jain |
| 9,608,809 B1 | 3/2017 | Ghetti et al. |
| 9,614,670 B1 | 4/2017 | Ghetti et al. |
| 9,736,153 B2 | 8/2017 | McDaniel et al. |
| 9,807,086 B2 | 10/2017 | Nordstrom et al. |
| 9,830,472 B2 | 11/2017 | Burckard |
| 10,033,702 B2 | 7/2018 | Ford et al. |
| 10,033,814 B2* | 7/2018 | Kim ....................... H01L 23/528 |
| 10,039,001 B2 | 7/2018 | Koyun et al. |
| 10,095,880 B2* | 10/2018 | Bent ....................... H04L 9/008 |
| 2003/0065632 A1 | 4/2003 | Hubey |
| 2007/0206521 A1 | 9/2007 | Osaje |
| 2012/0307674 A1 | 12/2012 | Mogre et al. |
| 2016/0073271 A1 | 3/2016 | Schultz et al. |

(Continued)

*Primary Examiner* — Amare F Tabor
(74) *Attorney, Agent, or Firm* — Michael A. Springs; Moore & Van Allen PLLC; James C. Edwards (57) ABSTRACT

A neural mesh data protection grid disposed amidst a tunnel acting as a transmission path for transmitting large files (i.e., file transfer). The grid includes a virtual matrix of containerized security zones. Each security zone is configured to act as prospective point in the transmission path for the data file or a segment of the data file. Further, each containerized security zone includes logic that is configured to perform one or more security checks on the data. The neural aspect of the data protection grid means that the logic is further configured to determine, over time, a trust level for the containerized security zone based on the trust/confidence that the zone has attained.

19 Claims, 5 Drawing Sheets

(56) References Cited

U.S. PATENT DOCUMENTS

2018/0007059 A1    1/2018  Innes et al.
2019/0253431 A1*  8/2019  Atanda ................. H04L 63/105

* cited by examiner

NEURAL MESH PROTECTION SYSTEM FOR DATA TRANSMISSION

FIELD OF THE INVENTION

The present invention is generally directed to network data transmission and, more specifically, creating a neural mesh protection system for transmitting large data files across a communication network.

BACKGROUND

Many enterprises have they need to communicate large data files (i.e., file transfers) across a communication network, such as an IP network or the like. For example, financial institutions communicate such large data files between other financial institutions, merchants and the like on a continuous basis. These files typically include data that is classified as non-public, confidential and/or private, such as names, addresses, account numbers, social security numbers and the like. Such data is the prime target of hackers who would nefariously benefit from having access to such data.

Typically large data files are sent via Transmission Control Protocol (TCP) or User Datagram Protocol (UDP). TCP file transfer provides reliable and ordered and error-checked delivery of a stream of octets (bytes or data packets) between applications running on host communicating via an IP network. UDP provides a connectionless datagram service that emphasizes reduced latency over reliability. However, since both protocols have been in use since the 1980's, hackers and other nefarious entities have found means by which these protocols can be comprised. While developments continue to be made that seemingly increase the security surrounding TCP and/or UDP file transfers it is always a matter of trying to stay one step ahead of the hackers and other nefarious entities.

Therefore, a need exists to develop more secure means for transmitting large data files.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, methods and/or the like for transmitting large files (i.e., file transfer) across a neural mesh data protection grid that is disposed amidst a tunnel acting as a transmission path for the data file. The grid includes a virtual matrix of containerized security zones. Each security zone is configured to act as prospective point in the transmission path for the data file or a segment of the data file. Further, each containerized security zone includes logic that is configured to perform one or more security checks on the data. The neural aspect of the data protection grid means that the logic is further configured to determine, over time, a trust level for the containerized security zone based on the trust/confidence that the zone has attained. For example, the trust level may depend on historical data related to (i) non-contamination of the zone (i.e., whether the zone has been intruded or attempts to intrude the zone), (ii) the type and or volume of data that the zone has encountered in the past, (iii) the number of instances in which the zone has used as a transmission point or the like. The trust level of a zone may then be used to determine if the zone is a candidate for data transmission, as well as determining entitlements afforded data located in the containerized security zone and authorizations for accessing a zone while data is located therein.

In specific embodiments of the invention, the containerized security zones that a data file or segments of the data file will encounter during a file transfer, referred to herein as the data transmission path, will not be a predetermined data transmission path determined prior to data transmission but, rather, is a dynamically determined during the course of the data file or segment of the data encountering the data protection grid. In this regard, the containerized security zones include logic that is configured to determine at least the next containerized security zone (and in some instances more than the next zone or all of the zones) within the virtual matrix that will serve as the next point in the data transmission path. The determination as to which containerized security zone is the next zone may be based on the security level of the current zone as well as the security level of the prospective downstream security zones. In addition to security levels, the determination as to which containerized security zone is the next zone may be based other factors, such as the type of data in the data file or data segment, entities associated with the data in the data file or segment of the data and the like.

In addition, the containerized security zones include logic that is configured to determine which security checks to perform on the data in the data file or segment of the data file. Such a determination may be based on the what security checks have previously been performed on the data at previous containerized security zones, the trust level of the corresponding containerized security zone, the type of data in the at least a portion of the data file, the one or more entities associated with data in the at least a portion of the data file, and/or the geographic location of at least one of the data transmitter or the data recipient.

As such, the neural data protection grid of the present invention is able to impart a higher of data transmission security than has heretofore been known.

A system for securing the transmission of data defines first embodiments of the invention. The system includes a first computing platform having a first memory and at least one first processor in communication with the first memory. The first memory stores a data file and the processor is configured to initiate transmission of the data file to a trusted zone (i.e., data file recipient). The system further comprises a second computing platform including a second memory and at least one second processor in communication with the second memory. The second memory includes the trusted zone and the second processor is configured to receive the data file and store the data file in the trusted zone.

The system further includes one or more neural data protection grids disposed at least between a tunnel acting as the transmission path for the data file. The neural data protection grid includes a virtual matrix of containerized security zones. Each containerized security zone is (i) configured to act as a prospective point in the transmission path for the data file or a segment of the data file, and (ii) includes logic configured to perform one or more security checks on data in the least a portion of the data file, and determine, over time, a trust level for a corresponding containerized security zone based on historical compliance of the containerized security zone to predetermined security standards.

In specific embodiments of the system, the logic in the containerized security zones is further configured to determine, based at least on trust levels of the containerized security zones, at least a next containerized security zone within the virtual matrix to act as a next point in the transmission path for the data file or segment of the data file. In related embodiments of the invention, the logic is further configured to determine at least one of (i) a type of data in the at least a portion of the data file, and (ii) one or more entities associated with data in the at least a portion of the data file. In such embodiments of the system, the determination of the least a next containerized zone may be further based on one or more of the, (i) the type of data in the at least a portion of the data file, (ii) the one or more entities associated with data in the at least a portion of the data file, and/or (iii) a geographic location of at least one of the first computing platform or the second computing platform.

In other embodiments of the system, the logic in the containerized security zones may be further configured to determine which security checks to perform on the data file or data segment based at least on one or more of (i) the trust level of the corresponding containerized security zone (ii) the type of data in the at least a portion of the data file, (iii) the one or more entities associated with data in the at least a portion of the data file, and/or (iv) a geographic location of at least one of the first computing platform or the second computing platform.

In still further embodiments of the system, the logic in the containerized security zones may be further configured to determine at least one of (a) a need to segment and a segment scheme for the data file or the segment of the data file (i.e., sub-segment) and (b) a need to reconfigure and a reconfiguration scheme for at least a portion of the data in the date file or a segment of the data file based on at least on one of (i) the type of data in the at least a portion of the data file, and (ii) the one or more entities associated with data in the at least a portion of the data file. In such embodiments of the system, the logic in the containerized security zones may be further configured to (i) segment the at least a portion of the data file in accordance with the segment scheme, and (ii) determine at least a next containerized security zone within the virtual matrix to act as a next point in the transmission path for each segment of the at least a portion of the data file, or reconfigure the least a portion of the data in the least a portion of the data file in accordance with the reconfiguration scheme.

In still further embodiments of the invention, the trust level of a containerized security zone is further used as a factor in determining at least one of (i) authorizations to entities granting access to data in the data file or segment of data while the file or segment of the file is located in containerized security zone, and (ii) entitlements afforded to an entity accessing data in the data file or data segment while the file or segment of the file is located in containerized security zone.

In further specific embodiments of the system, the logic in the containerized security zones if further configured to, upon receipt, verify an integrity of the data within the at least a portion of the data file (i.e., confirm that the data has not been tampered with or the like). In specific related embodiments of the system, verifying the integrity of the data may entail comparing at least one of data signatures or file signatures to known data signatures or file signatures. In still further related specific embodiments of the system, the logic in the containerized security zones is further configured to, in response to failing to verify the integrity of the data, perform at least one of (i) return the at least a portion of the data file to the first computing platform, and (ii) destruct data in the at least a portion of the data file. In other embodiments of the invention, in response to data element failing verification, the logic may be configured to (i) "lock" the data element in the corresponding cell for subsequent forensic analysis, (ii) destroy the cell with the locked data element, and (iii) create a new cell with the data element. In those instances in which the data and/or data elements are found to be unverifiable, the previous security zone's trust level is lowered based on such.

In specific embodiments of the system, the virtual matrix comprises a two-dimensional array of containerized security zones, wherein a first dimension of the array defines security zone levels categorized by different levels of security analysis performed on data comprising the at least a portion of the data file. In such embodiments of the system, a first security zone level closest to or included within the first computing platform is configured to provide one of a highest or a lowest level of security analysis and a second security zone closest to or included within the second computing platform is configured to provide one of a corresponding lowest or a highest level of security analysis (i.e., the level of security analysis in levels of the security zones may be descending or ascending in terms of proximity to the data transmitter (i.e., the first computing platform)).

In still further embodiments of the system, at least a portion of the neural data protection grid is further disposed within at least one of the first computing platform and the second computing platform. For example, one or more initial security zone levels may be disposed at the first computing platform and/or one or more final security zone levels may be disposed at the second computing platform.

In other specific embodiments of the invention, the neural data protection grid includes a first neural data protection grid is disposed within at least a portion of the first computing platform and a second neural data protection grid is disposed within at least a portion of the second computing platform. In such embodiments of the invention, the first and second neural protection grids may be configured to interconnect (i.e., mesh into one composite grid), over time, based on at least one of (i) the trust levels for the containerized security zones of the first and second neural data protection grids, and (ii) trust levels of the first and second computing platforms.

An apparatus for securing the transmission of data defines second embodiments of the invention. The apparatus comprises a memory and at least one processor in communication with the memory. The apparatus further includes a neural data protection grid stored in the memory, acting as a data transmission path for a data file being transmitted from a first entity to a second entity and comprising a virtual matrix of containerized security zones. Each containerized security zone (i) is configured to act as a prospective point in the data transmission path for at least a portion of the data file, and (ii) includes logic executed by or within the at least one processor and configured to (a) perform one or more security checks on data in the least a portion of the data file, and (b) determine, over time, a trust level for a corresponding containerized security zone based on historical compliance of the containerized security zone to predetermined security standards.

In specific embodiments of the apparatus, the logic is further configured to determine, based at least on the trust levels of the containerized security zones, at least a next containerized security zone within the virtual matrix to act as a next point in the transmission path for the at least portion of the data file. In related embodiments of the apparatus, the logic is further configured to determine at least one of (i) a type of data in the at least a portion of the data file, and (ii) one or more entities associated with data in the at least a portion of the data file. In other related embodiments of the apparatus, the logic is further configured to determine at least one of (a) which security checks to perform on the data in the least a portion of the data file and (b) at least the next containerized security zone based on one or more of (i) the trust level of a corresponding containerized security zone, (ii) the type of data in the at least a portion of the data file, (iii) the one or more entities associated with data in the at least a portion of the data file, and (iv) a geographic location of at least one of the first computing platform or the second computing platform.

A computer-implemented method for securing the transmission of data defines third embodiments of the invention. The computer-implemented method is implemented by or more processing devices. The method includes initiating transmission of at least a portion of data file via a neural data protection grid that acts as a data transmission path between a first entity transmitting the data file and a second entity receiving the data file and receiving the at least a portion of the data file at a containerized security zone of a virtual matrix within the neural data protection grid. The method further includes executing logic within the containerized security zone to perform one or more security checks on data in the least a portion of the data file, and executing logic within the containerized security zone to determine, over time, a trust level for the containerized security zone based on historical compliance of the containerized security zone to security standards.

Thus, according to embodiments of the invention, which will be discussed in greater detail below, the present invention provides for transmitting large files (i.e., file transfer) across a neural mesh data protection grid that is disposed amidst a tunnel acting as a transmission path for the data file. The grid includes a virtual matrix of containerized security zones. Each security zone is configured to act as prospective point in the transmission path for the data file or a segment of the data file. Further, each containerized security zone includes logic that is configured to perform one or more security checks on the data. The neural aspect of the data protection grid means that the neural logic is further configured to determine, over time, a trust level for the containerized security zone based on the trust/confidence that the zone has attained. The trust level of a zone may then be used to determine if the zone is a candidate for data transmission, as well as determining entitlements afforded data located in the containerized security zone and authorizations for accessing a zone while data is located therein.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, systems, apparatus, and methods are described in detail below for a neural mesh data protection grid for transmitting large files (i.e., file transfer) from a data file transmitting entity to a data file recipient entity. As previously discussed, enterprises, such as financial institutions or the like, constantly transmit and receive large data files, such as transaction files and the like. These files typically include non-public information, such as customer names, addresses, account numbers, social security numbers and the like. As such, these files are prone to attack from hackers or the like who would benefit from being in possession of such data. The neural mesh protection grid described herein adds a heightened layer of security to file transfer and lessens the likelihood of attempted and/or successful attacks by hackers.

The grid includes a virtual matrix of containerized security zones. Each security zone is configured to act as prospective point in the transmission path for the data file or a segment of the data file. Further, each containerized security zone includes logic that is configured to perform one or more security checks on the data. The neural aspect of the data protection grid means that the logic is further configured to determine, over time, a trust level for the containerized security zone based on the trust/confidence that the zone has attained. For example, the trust level may depend on historical data related to (i) non-contamination of the zone (i.e., whether the zone has been intruded or attempts to intrude the zone), (ii) the type and or volume of data that the zone has encountered in the past, (iii) the number of instances in which the zone has used as a transmission point or the like. The trust level of a zone may then be used to determine if the zone is a candidate for data transmission, as well as determining entitlements afforded data located in the containerized security zone and authorizations for accessing a zone while data is located therein.

In specific embodiments of the invention, the containerized security zones that a data file or segments of the data file will encounter during a file transfer, referred to herein as the data transmission path, will not be a predetermined data transmission path determined prior to data transmission but, rather, is a dynamically determined during the course of the data file transmission. In this regard, the containerized security zones include logic that is configured to determine at least the next containerized security zone (and in some instances more than the next zone or all of the zones) within the virtual matrix that will serve as the next point in the data transmission path. The determination as to which containerized security zone is the next zone may be based on the security level of the current zone as well as the security level of the prospective downstream security zones. In addition to security levels, the determination as to which containerized security zone is the next zone may be based other factors, such as the type of data in the data file or data segment, entities associated with the data in the data file or segment of the data and the like.

In addition, the containerized security zones include logic that is configured to determine which security checks to perform on the data in the data file or segment of the data file. Such a determination may be based on the what security checks have previously been performed on the data at previous containerized security zones, the trust level of the corresponding containerized security zone, the type of data in the at least a portion of the data file, the one or more entities associated with data in the at least a portion of the data file, and/or the geographic location of at least one of the data transmitter or the data recipient.

Figure 1:
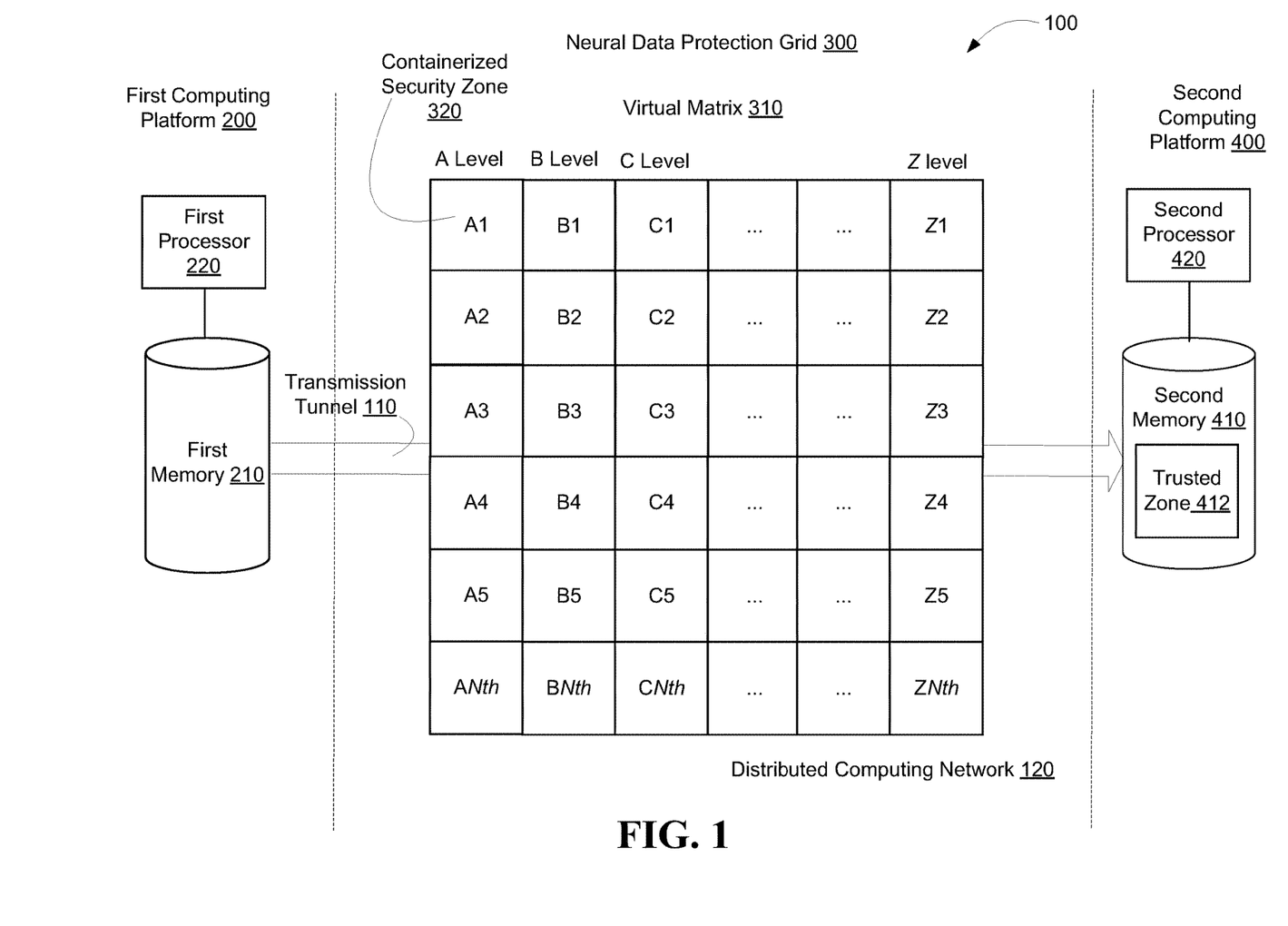
FIG. 1 is a schematic diagram of a system for securing the transmission of data through implementation of a neural mesh protection grid, in accordance with some embodiments of the present disclosure.

Turning now to the figures, FIG. 1 a schematic diagram is provided of an exemplary system 100 for securing the transmission of data through implementation of a neural mesh protection grid 300, in accordance with embodiments of the present invention. The system includes a first computing platform 200 that includes a first memory 210 and at least one first processor 220 in communication with the first memory 210. The first memory stores a data file (not shown in FIG. 1) and the processor 220 of configured to initiate transmission of the data file to an intended recipient. As such, first computing platform 200, which comprises multiple different apparatuses, computing devices and the like, is under the control of the entity that is transmitting the data file.

The first memory 210 may comprise volatile and non-volatile memory, such as read-only and/or random-access memory (RAM and ROM), EPROM, EEPROM, flash cards, or any memory common to computing platforms). Moreover, memory 210 may comprise cloud storage, such as provided by a cloud storage service and/or a cloud connection service. First processor 220 may be an application-specific integrated circuit ("ASIC"), or other chipset, logic circuit, or other data processing device. First processor 220 may execute one or more application programming interface (APIs) (not shown in FIG. 1) that interfaces with any resident programs, such as logic associated with an application for file transfer. First processor 220 may include various processing subsystems (not shown in FIG. 1) embodied in hardware, firmware, software, and combinations thereof, that enable the functionality of first computing platform 200 and the operability of the first computing platform 200 on the distributed communication network 120 through which the tunnel connection, used as the transmission path for data file, is established and maintained.

The system additionally includes a second computing platform 400 that includes a second memory 410 and at least second first processor 420 in communication with the second memory 410. The second memory includes a trusted zone 412. The second processor 412 is configured to receive the data file transmitted form the first computing platform 200 and store the data file in the trusted zone 412. A trusted zone 412 within memory 410 is an area that is secured from unauthorized access and intrusion. As such, second computing platform 400, which comprises multiple different apparatuses, computing devices and the like, is under the control of the entity that is receiving the transmission of the data file.

Similar to the first computing platform 200, the second memory 410 may comprise volatile and non-volatile memory, such as read-only and/or random-access memory (RAM and ROM), EPROM, EEPROM, flash cards, or any memory common to computing platforms). Moreover, second memory 410 may comprise cloud storage, such as provided by a cloud storage service and/or a cloud connection service. Second processor 420 may be an application-specific integrated circuit ("ASIC"), or other chipset, logic circuit, or other data processing device. Second processor 420 may execute one or more application programming interface (APIs) (not shown in FIG. 1) that interfaces with any resident programs, such as logic associated with an application for file transfer. Second processor 420 may include various processing subsystems (not shown in FIG. 1) embodied in hardware, firmware, software, and combinations thereof, that enable the functionality of second computing platform 400 and the operability of the second computing platform 400 on the distributed communication network 120 through which the tunnel connection, used as the transmission path for data file, is established and maintained.

System 100 additionally includes neural data protection grid 300 that is disposed, at least in part, within a transmission tunnel 100 for transmitting the data file between the first computing platform 200 and the second computing platform 400. In the illustrated embodiment of FIG. 1, the neural data protection grid 300 is disposed entirely within distributed computing network 120 the transmission tunnel 100; however, in other embodiments of the invention, as shown and subsequently described in relation to FIGS. 2A-2C and 3A-3B, the neural data protection grid 300 may be disposed partially or entirely within the first computing system 200 and/or the second computing system 400.

The neural data protection grid 300 includes a virtual matrix 310 of a plurality of containerized security zones 320. Each containerized security zone 320 is configured to act as a prospective point in the transmission path for at least a portion of the data file (i.e., a segment of the data file). A container is a class, a data structure or an abstract data type (ADT) whose instances are collections of other objects. In other words, containers store objects in an organized way that follows specific access rules. The size of the container depends on the number of objects (elements) it contains. Underlying implementations of various container types may vary in size and complexity. Containers can be characterized by the following three properties (i) access, which is the way of accessing the objects of the container. In the case of a grid/matrix, such as implemented in the present invention, access is done with an array index, (ii) storage, which is the way of storing the objects of the container, and (iii) traversal, which is the way of traversing the objects of the container.

Each containerized security zone 320 includes logic that is configured to perform one or more security checks on data in the portion of the data file residing in the security zone 320. Further, each containerized security zone 320 includes logic that is configured to determine, over time (i.e., neural network or deep learning logic) a trust level for a corresponding containerized security zone 320 based on the historical nature of the security zone.

In the illustrated embodiment of FIG. 1 the virtual matrix 310 is a two-dimensional array of containerized security zones 320. In other embodiments of the invention the containerized security zones 320 may be formed of other dimensional arrays, such as a one-dimensional or three-dimensional array or the like. In FIG. 1 the two-dimensional array includes a first dimension (i.e., the horizontal dimension) which defines security zone levels (i.e., A level, B level, C level . . . . Z level) with each level categorized by different levels of security analysis/checks performed on data in the portion of the data file residing in security zone within the security zone level. In specific embodiments of the invention, the levels may increase or decrease in terms of the amount of security analysis/checks performed the closest or furthest the level is to the first computing platform 200 or the second computing platform 400. In other words, the security zone level closest to the first computing platform 200 (i.e., A level) may be configured to the highest level of security analysis/checks, while the security zone closest to the second computing platform 400 (i.e., Z level) may be configured to the lowest level of security analysis/checks or vice versa. In the illustrated embodiment of FIG. 1, the second dimension (i.e., the vertical dimension) includes various security zones 320 within a given security zone level, so as to accommodate various different portions of the data file being simultaneously transmitting through the data protection grid 300 and/or multiple different data files being simultaneously transmitting through the data protection grid 300.

In specific embodiments of the invention, the logic in at least a portion of the containerized security zones 320 is configured to determine, based at least on trust levels of containerized security zones 320, the next containerized security zone 320 and/or the next security zone level within the virtual matrix 310 to act as the next point in the transmission path for the portion of the data file. In other embodiments of the invention, the logic may be determined more than the next containerized security zone 320 (i.e., two or more subsequent containerized security zones and, in some instances, all of the subsequent containerized security zones making up the transmission path through the neural protection grid). For example, once a portion of the data file is transmitted to a containerized security zone 320 within level A (for example, security zone A2, the logic in security zone A2 may determine the next containerized security zone 320 and/or security zone level or may determine the entire security zone path for the portion of the data file. In addition to the trust level of the containerized security zones 320, other factors may be used in determining the next containerized security zone 320 and/or the next security zone level within the virtual matrix 310 to act as the next point in the transmission path for the portion of the data file. Such other factors, may include the specific type of data in the portion of the data file, entities/owners of the data in the file (e.g., the individual connected with address, account number or the like or the unit/section of the enterprise associated with the data), the geographic location of the first computing platform in relation to the geographic location of the second computing platform and the like.

In additional embodiments of the invention, as will be described in more detail in relation to FIG. 4, the neural mesh protection grid 300 serves the purpose of being able to disorder (i.e., scramble) the transmission path of the data file within the virtual matrix 310 by segmenting the portion of the data file at any containerized security zone 320 and transmitting each segment to different next containerized security zones. In other embodiments of the invention, the containerized security zones are configured to reorganize the data within the portion of the data file (i.e., mash-up or the like) so as to create data that would otherwise be useless to an unauthorized accessor of the data within the neural mesh protection grid 300.

Figure 2A:
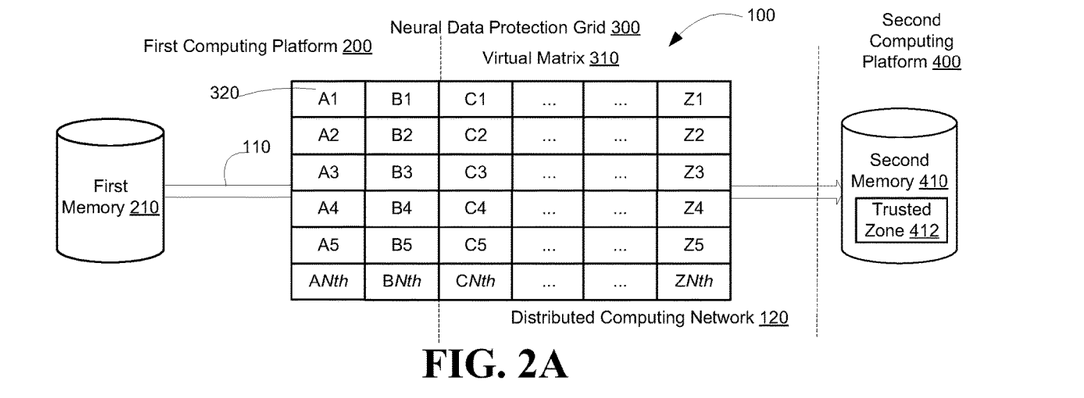
FIGS. 2A-2C are schematic diagrams of a neural mesh protection grid exemplifying different dispositions of the grid within the first and second computing platforms and the transmission tunnel, in accordance with some embodiments of the present disclosure.
Figure 2B:
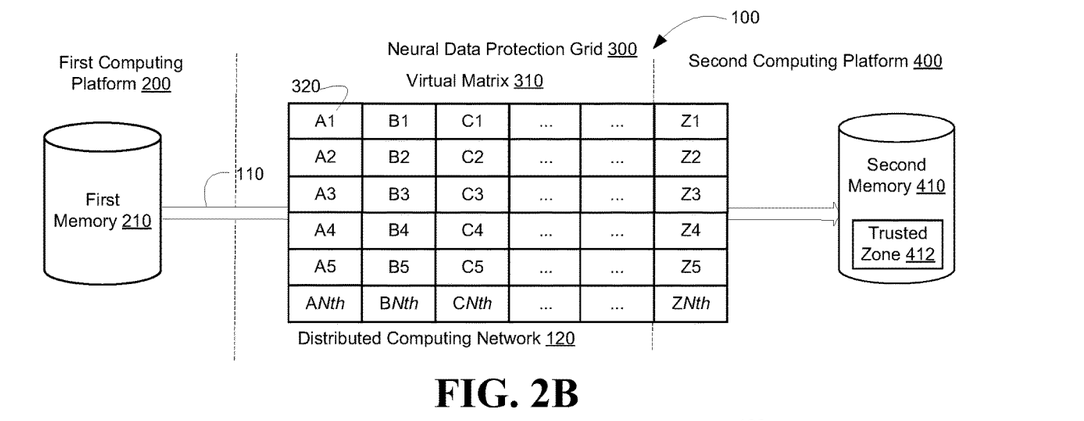
Figure 2C:
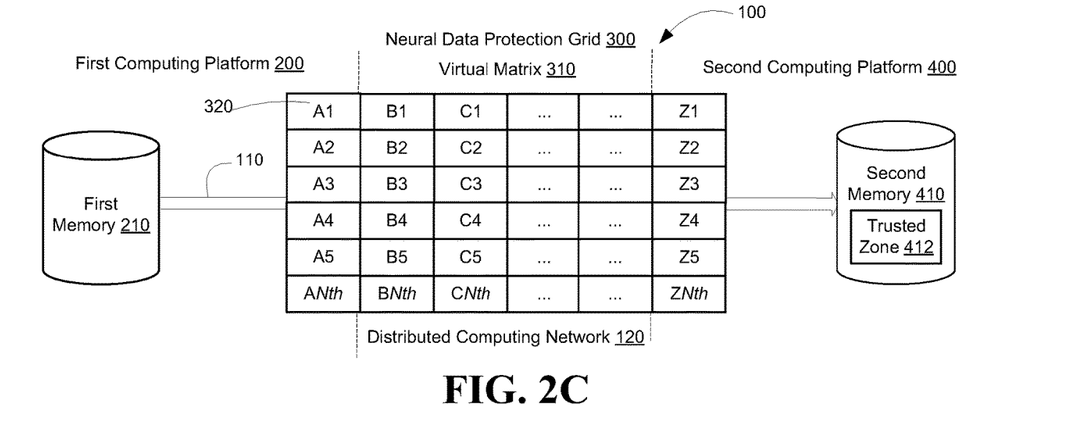

Referring to FIGS. 2A-2C, shown are various alternative embodiments of the invention in which a portion of the neural data protection grid 300 is disposed in the first computing platform 200 and/or the second computing platform 400. For example, as shown in FIG. 2A a portion of the neural protection grid 300 is disposed within the first computing platform 200, specifically security zone level A and security zone level B are disposed in first computing platform 200. Such a configuration of the neural data protection grid 300 may be advantageous in those instances in which security zone level A is configured to receive the entire data file and segment the data file according to data type (i.e., a portion of the data file containing only names, addresses, social security numbers or the like), an owner of the data (i.e., an individual/customer associated with a record in the data file), an entity within the enterprise associated with the data (i.e., division, business line or the like), such that each segment can then to transmitted to a different containerized security zone 320 within one or different security zone levels based on the confidentiality associated with the type of data and/or the status of the owner of the data or the entity within the transmitting entity.

As shown in FIG. 2B a portion of the neural protection grid 300 is disposed within the second computing platform 300, specifically security zone level Z is disposed in first computing platform 200. Such a configuration of the neural data protection grid 300 may be advantageous in those instances in which security zone level Z is configured to re-assemble a previously segmented data file or portion of a data file or organize data that has previously been mashed-up prior to communicating the data file or portions of the data file to the trusted 412 of second memory 410.

As shown in FIG. 2C a portion of the neural protection grid 300 is disposed within the first computing platform 200 and the second computing platform 400, specifically security zone level A and security zone level B are disposed in first computing platform 200 and security zone level Z is disposed in the second computing platform 400. Such a configuration of the neural data protection grid 300 may be advantageous in those instances in which security zone level A is configured to receive the entire data file and segment the data file and security zone level Z is configured to re-assemble the previously segmented data file or portion of a data file.

Figure 3A:
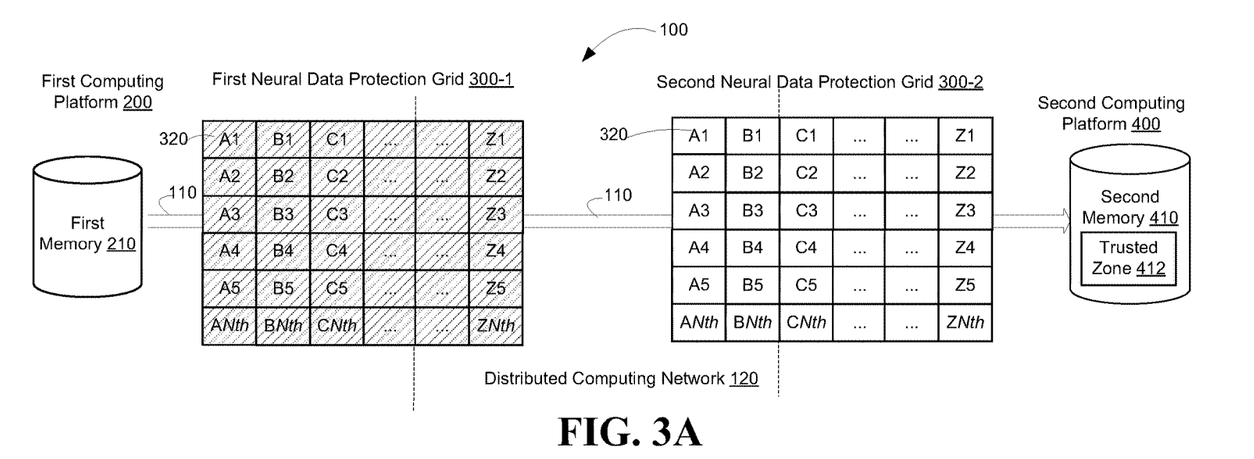
FIGS. 3A-3B are schematic diagrams of multiple neural mesh protection grid disposed at least partially within the first and second computing platforms and the interconnection/meshing, over time, of the neural mesh protections grids, in accordance with some alternate embodiments of the present disclosure.
Figure 3B:
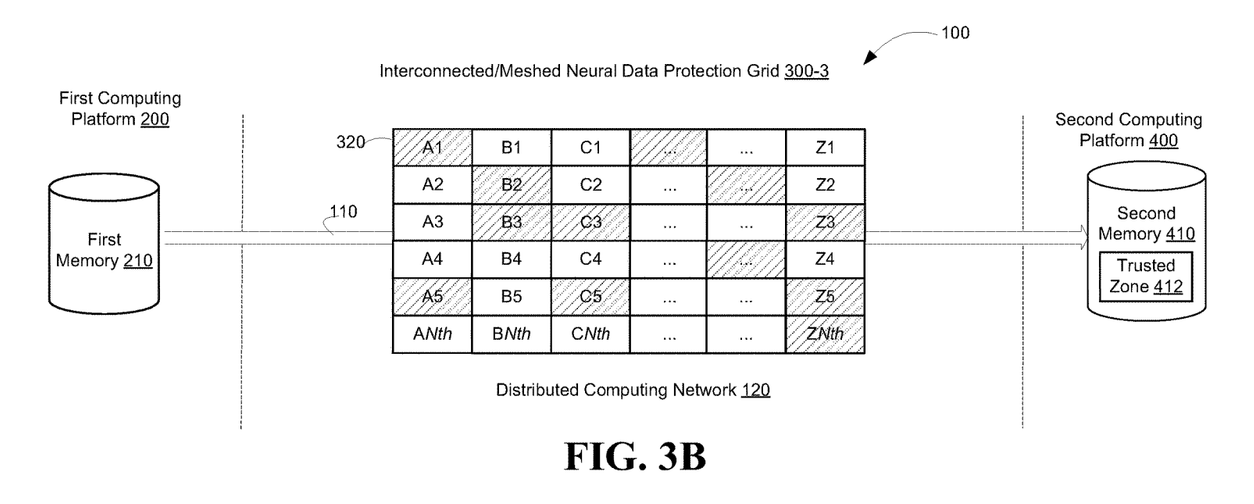

Referring to FIGS. 3A and 3B, shown are various alternative embodiments of the system 100 in which two neural data protection grids 300 are employed (FIG. 3A) and subsequently interconnect/mesh to form one contiguous interconnected/meshed neural data protection grid (FIG. 3B). Specifically, in FIG. 3A, first neural data protection grid 300-1 is shown as being disposed partially in the first computing platform 200 and partially disposed in the distributed computing network 120 and second neural data protection grid 3002 is shown as being disposed partially in the second computing platform 200 and partially disposed in the distributed computing network 120. Due to the neural nature of the networks in which historical performance of the containerized security zones 320 allows for the grid to become knowledgeable/learn the characteristics of containerized security zones 320, the first and second neural data protection grids 300-1 and 300-2 may interconnect or mesh into an interconnected/meshed neural data protection grid 300-3 as shown in FIG. 3B. In the illustrated embodiment of FIG. 3B, we assume that the security zone levels in the first and second neural data protection grids 300-1 and 300-2 are the same, such that the interconnected/meshed neural data protection grid 300-3 may be formed of the containerized security zones 320 having the highest trust levels/ratings. In other embodiments of the invention, the interconnected/ meshed neural data protection grid 300-3 may be configured altogether differently than shown in FIG. 3B. For example, the interconnected/meshed neural data protection grid 300-3 with all of containerized security zones 320 in both first and second neural data protection grids or may be blend attributes from corresponding security zones within the same security zone level to form the composite interconnected/ meshed neural data protection grid 300-3.

Figure 4:
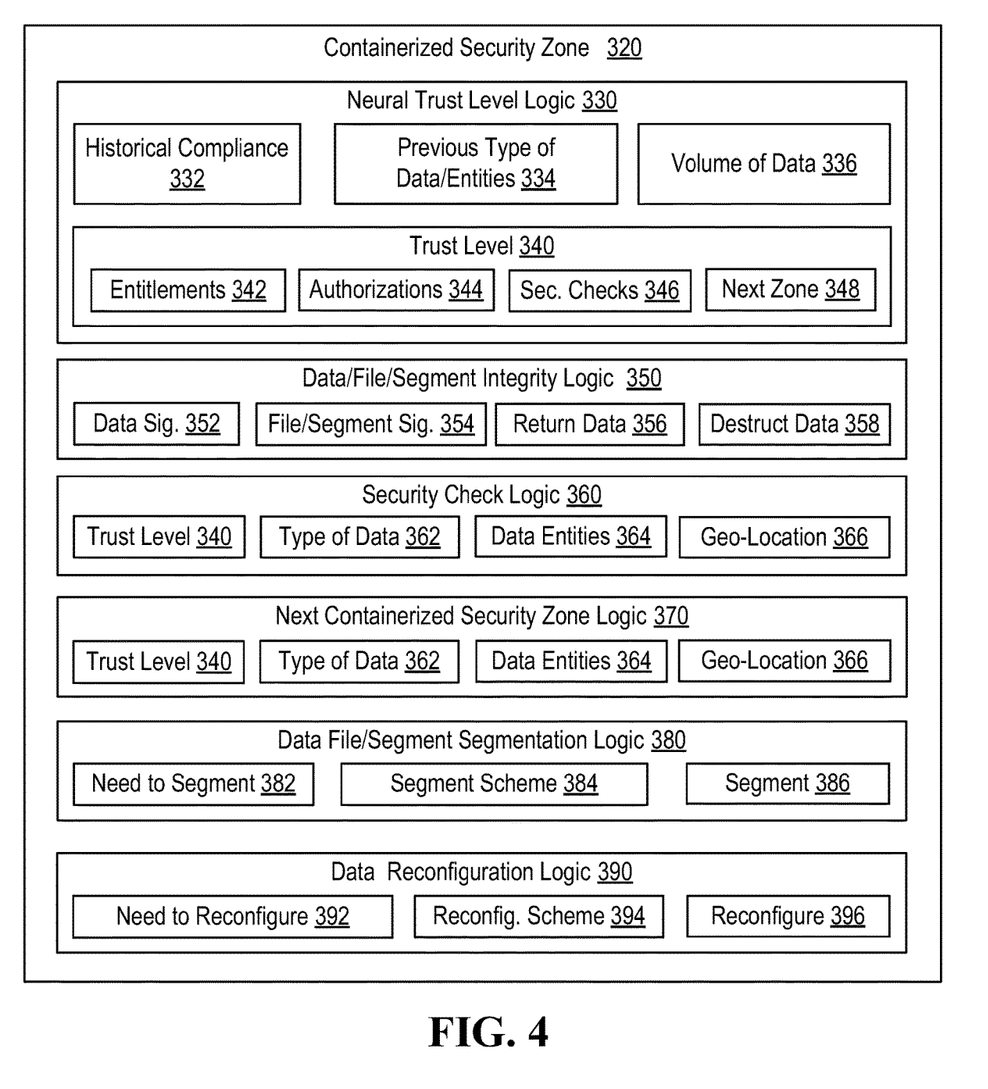
FIG. 4 is a block diagram of a containerized security zone highlighting different logical capabilities within such, in accordance with some embodiments of the present disclosure.

Referring to FIG. 4, a block diagram is depicted of containerized security zone 320 highlighting various different logical elements that may be included in various different embodiments of the containerized security zone 320, in accordance with embodiments of the present invention.

As previously mentioned, containerized security zone 320 is configured to include neural trust level/rating logic 330 which is configured to determine, over time, the trust level 340 (i.e., trust rating) for a corresponding containerized security zone 320. The neural nature of logic 330 means that the trust level/rating is dynamically and/or constantly being determined/assessed and will evolve over time. The trust level logic 330 is be configured to determine the trust level based on the containerized security zone's historical compliance record with regards to security standards (e.g., how many and the degree/nature of previous unauthorized attempts to access or successful unauthorized access to the security zone have occurred). In addition, other factors may be used in determining the trust level 340 of the containerized security zone 320, such as, but not necessarily limited to, previous types of data or entities associated with previous data 334 that the security zone 320 has encountered, the volume of data 336 encountered by the security zone 320 (or the number of times that the security zone has been used as point in a transmission path).

The trust level 340 may be determinative of various attributes and functions of the containerized security zone 320. As previously discussed, the trust level 340 may be used as a determinative factor for determining the next security zone or security level 348 in the transmission path and/or the amount of security checks 346 or level of security analysis required to be performed at the containerized security zone 320. For example, if the trust level/rating for a containerized security zone 320 it may be possible to skip one or more the security zone levels or, in some instances, move directly to the last security zone level (i.e., level Z). In addition, the trust level 340 may be determinative of the entitlements 342 and or authorizations 344 afforded to the containerized security zone 320. Authorizations 344 what entities are authorized to access the containerized security zone 320 and entitlements include what functions authorized entities are entitled to perform when accessing the containerized security zone (e.g., read-only, access the data, edit/change the data and the like). For example, one entity (e.g., an antivirus component) may be entitled to read/scan the data only, while another entity (e.g., a data tagger) may be configured to edit the data (e.g., replace/insert/redact data elements)

Additionally, containerized security zone 320 may include data/file/segment integrity logic 350 configured to verify, upon receipt of the data file or portion of the data file, the integrity of the data. In specific embodiments of the invention, the integrity logic 350 is configured to compare the data signature 352 and/or file/segment signature 354 (e.g., hash values or the like) to known data signatures and/or file/segment signatures to insure that the data elements and/or data file or date file segments have not been tampered with during transmission. In specific embodiments of the invention, in the event that the integrity logic 350 fails to verify the data and/or the data file/segment, the integrity logic 350 may be further configured to flag the data elements and/or data file/segment, return data 356 to the first computing platform 200 and/or destruct/destroy data 358 that has failed integrity verification. In other embodiments of the invention, in response to data element failing verification, the integrity logic 350 may be configured to (i) "lock" the data element in the corresponding cell for subsequent forensic analysis, (ii) destroy the cell with the locked data element, and (iii) create a new cell with the data element. In those instances in which the data and/or data elements are found to be unverifiable, the previous security zone's trust level is lowered based on such. In other embodiments of the invention, the data found to be unverifiable (e.g., detected malware objects or the like) may be replaced with a benign data string or the like.

As previously discussed, containerized security zone 320 may additionally include security check logic 360 and next security zone determining logic 370. Security check logic 360 determined the amount or level of security checks/analysis to be performed on the data in the containerized security zone 320. Next security zone determining logic 370 determines the next security zone (or the entire security zone path) in the transmission path for the data file or segment of the data file. The security check logic 360 and next security zone determining logic 370 may base their respective decisions on various different factors, including but not necessarily limited to, the trust level 340 of the containerized security zone 320, the type of data 362 in the data file or data file segment (i.e., level confidentiality surrounding the data), the data entities/owner 364 associated with the data (i.e., which entity/individual is the data attributed to or which entity within the enterprise generated the data) and the geographic location 366 of the first computing platform 200 (i.e., the data file transmitting entity) in relation to the second computing platform 400 (i.e., the data file receiving entity)

The containerized security zone 320 may additionally include data file/segment segmentation logic 380 that is configured to (i) determine a need to segment 382 the data file or the portion/segment of the data file and, in response to determining the need, (ii) determine a segmentation scheme 384 (i.e., the number of segments or how the data file or segment should be parsed/segmented). In response to determining the need and the segmentation scheme, logic 380 is configured to segment 386 the data file or portion/segment of the data in accordance with the determined segmentation scheme. Once the data file or portion of the data file is segmented, the next containerized security zone 370 can determine the next containerized security zone or security zone level for each segment of the data file or portion/segment of the data file. It should be noted that the data segments may be combined at one of the last security zone levels or may be combined at the second computing platform 400 or in some instances the segmented data file portions may be stored in the secured zone 412 and subsequently combined prior to use.

Moreover, the containerized security zone 320 may additionally include data reconfiguration logic 380 that is configured to (i) determine a need to reconfigure/reorganize 392 the data in the data file/portion of the data file and, in response to determining the need, (ii) determine a reconfiguration scheme 394 (i.e., random reconfiguration or ordered reconfiguration). In response to determining the need and the reconfiguration scheme, logic 390 is configured to reconfigure 396 or otherwise reorder the data in the data file. It should be noted that the reconfigured data may be placed back into its original intended order at one of the last security zone levels in the neural data protection grid 300 or may be placed back into its original intended order at the second computing platform 400 or in some instances the reconfigured data may be stored in the secured zone 412 and subsequently placed back into its original intended order prior to use.

Figure 5:
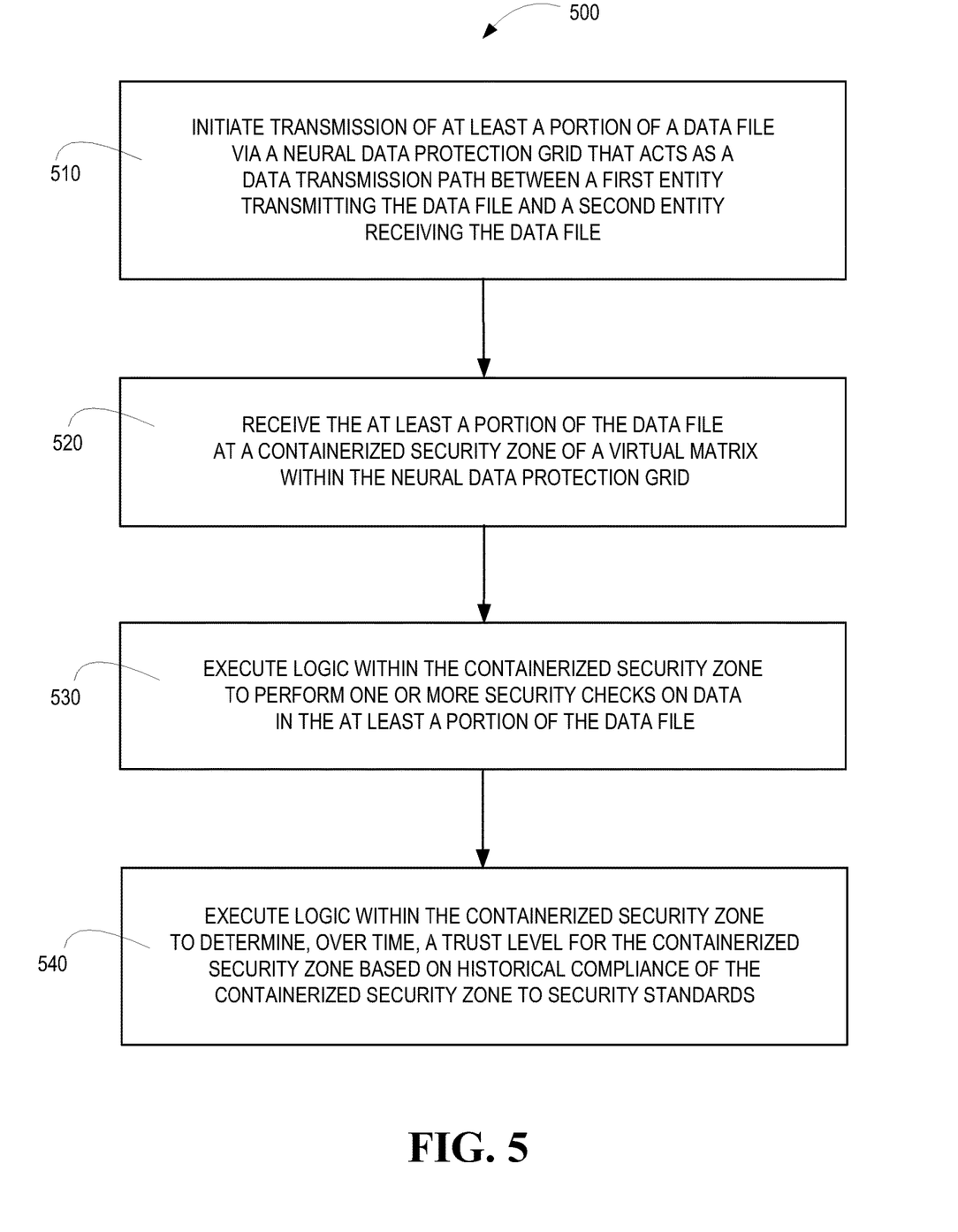
FIG. 5 is a flow diagram of a method for securing the transmission of data through implementation of a neural mesh protection grid, in accordance with some embodiments of the present disclosure.

Referring to FIG. 5 a flow diagram is present of a method 500 for securing the transmission of data through implementation of a neural mesh protection grid, in accordance with embodiments of the present invention. At Event 510, transmission of at least a portion of a date file is initiated via one or more neural data protection grids that acts as a data transmission path between a first entity transmitting the data file and a second entity receiving the data file. The neural protection grids may be disposed in computing apparatus of a distributed computing network, the first entity transmitting the data file and/or the second entity receiving the transmission of the data file.

At Event 510, the at least a portion of the data file is received at a containerized security zone of the virtual matrix within the neural data protection grid. The containerized security zone may be located within a first security zone level (e.g., the zone closest to the first entity transmitting the data).

At Event 520, logic within the containerized security zone is executed to perform one or more security checks on the data in the at least a portion of the data file. In specific embodiments the one or more security checks that are performed are determined based on the trust level of the containerized security zone, the type of data, the entities associated with the data, the geographic locations of the first and/or second entities transmitting and receiving the data and the like.

At Event 530, neural logic within the containerized security zone is executed to determine, over time, a trust level for the containerized security zone based at least on the historical compliance of the security zone to security standards (e.g., whether the security zone has experienced unauthorized access or attempted unauthorized access and the nature of such accesses and the like). In other instance the trust level/rating may be based on other factors, such as previous types of data encountered in the security zone, previous entities/owners associated with the data, volume of data encountered in the security zone, quantity of time security zone has been used as a point in a transmission path and the like.

In optional embodiments of the method (not shown in FIG. 5) the logic in the containerized security zone may be configured to determine the next security zone or the next security zone level to which the data file/segment of the data file is to be transmitted. In specific embodiments such logic may determine more security zones or security zones levels than just the next security zone or security zone level, for example, the entire path of security zones or security zones levels within the neural data protection grid that the data file/portion of the data file are to be transmitted through.

Thus, present embodiments of the invention providing systems, apparatus methods and/or the like provide for transmitting large files (i.e., file transfer) across a neural mesh data protection grid that is disposed amidst a tunnel acting as a transmission path for the data file. The grid includes a virtual matrix of containerized security zones. Each security zone is configured to act as prospective point in the transmission path for the data file or a segment of the data file. Further, each containerized security zone includes logic that is configured to perform one or more security checks on the data. The neural aspect of the data protection grid means that the neural logic is further configured to determine, over time, a trust level for the containerized security zone based on the trust/confidence that the zone has attained. The trust level of a zone may then be used to determine if the zone is a candidate for data transmission, as well as determining entitlements afforded data located in the containerized security zone and authorizations for accessing a zone while data is located therein.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for securing the transmission of data, the system comprising:
a first computing platform including a first memory and at least one first processor in communication with the first memory, wherein the first memory stores a data file and the processor is configured to initiate transmission of the data file to a trusted zone;
a second computing platform including a second memory and at least one second processor in communication with the second memory, wherein the second memory includes the trusted zone and the second processor is configured to receive the data file and store the data file in the trusted zone; and
one or more neural data protection grids disposed at least between a tunnel acting as a transmission path for the data file, wherein the neural data protection grid comprises a virtual matrix of containerized security zones, wherein each containerized security zone (i) is configured to act as a prospective point in the transmission path for at least a portion of the data file, and (ii) includes logic configured to perform one or more security checks on data in the least a portion of the data file and determine, over time, a trust level for a corresponding containerized security zone based on historical compliance of the containerized security zone to predetermined security standards;
wherein the virtual matrix comprises a two-dimensional array of containerized security zones, wherein a first dimension of the array defines security zone levels categorized by different levels of security analysis performed on data comprising the at least a portion of the data file, and wherein the second dimension indicates various security zones within a given security level; and
wherein a first security zone level included within the first computing platform is configured to provide one of a highest or a lowest level of security analysis and a second security zone included within the second computing platform is configured to provide one of a lowest or a highest level of security analysis.

2. The system of claim 1, wherein the logic is configured to determine, based at least on trust levels of containerized security zones, at least a next containerized security zone within the virtual matrix to act as a next point in the transmission path for the at least portion of the data file.

3. The system of claim 2, wherein the logic is further configured to determine at least one of (i) a type of data in the at least a portion of the data file, and (ii) one or more entities associated with data in the at least a portion of the data file.

4. The system of claim 3, wherein the logic is further configured to determine which security checks to perform on the data in the least a portion of the data file based at least on one or more of (i) the trust level of a corresponding containerized security zone, (ii) the type of data in the at least a portion of the data file, (iii) the one or more entities associated with data in the at least a portion of the data file, and (iv) a geographic location of at least one of the first computing platform or the second computing platform.

5. The system of claim 3, wherein the logic is further configured to determine at least the next containerized security zone based further on at least one of (i) the type of data in the at least a portion of the data file, (ii) the one or more entities associated with data in the at least a portion of the data file and (iii) a geographic location of at least one of the first computing platform or the second computing platform.

6. The system of claim 3, wherein the logic is further configured to determine at least one of (a) a need to segment and a segment scheme for the at least a portion of the data file and (b) a need to reconfigure and a reconfiguration scheme for at least a portion of the data in the at least a portion of the data file based on at least on one of (i) the type of data in the at least a portion of the data file, and (ii) the one or more entities associated with data in the at least a portion of the data file.

7. The system of claim 6, wherein the logic is further configured to (i) segment the at least a portion of the data file in accordance with the segment scheme, and (ii) determine at least a next containerized security zone within the virtual matrix to act as a next point in the transmission path for each segment of the at least a portion of the data file or reconfigure the least a portion of the data in the least a portion of the data file in accordance with the reconfiguration scheme.

8. The system of claim 1, wherein the trust level for the corresponding containerized security zone is used to determine at least one of (i) authorizations to entities granting access to data in the at least a portion of the data file contained the corresponding containerized security zone, and (ii) entitlements afforded to an entity accessing data in the at least a portion of the data file contained the corresponding containerized security zone.

9. The system of claim 1, wherein the logic is further configured to, upon receipt, verify an integrity of the data within the at least a portion of the data file.

10. The system of claim 9, wherein the logic is further configured to verify the integrity of the data by comparing at least one of data signatures or file signatures to known data signatures or file signatures.

11. The system of claim 10, wherein the logic is further configured to, in response to failing to verify the integrity of the data, perform at least one of (i) return the at least a portion of the data file to the first computing platform, and (ii) destruct data in the at least a portion of the data file.

12. The system of claim 1, wherein at least a portion of the neural data protection grid is further disposed within at least one of the first computing platform and the second computing platform.

13. The system of claim 1, wherein at least a portion of a first neural data protection grid is disposed within the first computing platform and at least a portion of a second neural data protection grid is disposed within at the second computing platform.

14. The system of claim 13, wherein the first and second neural data protection grids are configured to interconnect, over time, based on at least one of (i) the trust levels for the containerized security zones of the first and second neural data protection grids and (ii) trust levels of the first and second computing platforms.

15. An apparatus for securing the transmission of data, the apparatus comprising:
a memory;
at least one processor in communication with the memory; and
a neural data protection grid stored in the memory, acting as a data transmission path for a data file being transmitted from a first entity to a second entity and comprising a virtual matrix of containerized security zones, wherein each containerized security zone (i) is configured to act as a prospective point in the data transmission path for at least a portion of the data file, and (ii) includes logic executed by or within the at least one processor and configured to:
perform one or more security checks on data in the least a portion of the data file, and
determine, over time, a trust level for a corresponding containerized security zone based on historical compliance of the containerized security zone to predetermined security standards;
wherein the virtual matrix comprises a two-dimensional array of containerized security zones, wherein a first dimension of the array defines security zone levels categorized by different levels of security analysis performed on data comprising the at least a portion of the data file, and wherein the second dimension indicates various security zones within a given security level; and
wherein a first security zone level included within the first computing platform is configured to provide one of a highest or a lowest level of security analysis and a second security zone included within the second computing platform is configured to provide one of a lowest or a highest level of security analysis.

16. The apparatus of claim 15, wherein the logic is further configured to: determine, based at least on the trust levels of the containerized security zones, at least a next containerized security zone within the virtual matrix to act as a next point in the transmission path for the at least portion of the data file.

17. The apparatus of claim 16, wherein the logic is further configured to: determine at least one of (i) a type of data in the at least a portion of the data file, and (ii) one or more entities associated with data in the at least a portion of the data file.

18. The apparatus of claim 17, wherein the logic is further configured to: determine at least one of (a) which security checks to perform on the data in the least a portion of the data file and (b) at least the next containerized security zone based on one or more of (i) the trust level of a corresponding containerized security zone, (ii) the type of data in the at least a portion of the data file, (iii) the one or more entities associated with data in the at least a portion of the data file, and (iv) a geographic location of at least one of the first computing platform or the second computing platform.

19. A computer-implemented method for securing the transmission of data, the computer-implemented method is implemented by one or more processing devices and comprises:
initiating transmission of at least a portion of data file via a neural data protection grid that acts as a data transmission path between a first entity transmitting the data file and a second entity receiving the data file;
receiving the at least a portion of the data file at a containerized security zone of a virtual matrix within the neural data protection grid;
executing logic within the containerized security zone to perform one or more security checks on data in the least a portion of the data file; and
executing logic within the containerized security zone to determine, over time, a trust level for the containerized security zone based on historical compliance of the containerized security zone to security standards;
wherein the virtual matrix comprises a two-dimensional array of containerized security zones, wherein a first dimension of the array defines security zone levels categorized by different levels of security analysis performed on data comprising the at least a portion of the data file, and wherein the second dimension indicates various security zones within a given security level; and
wherein a first security zone level included within the first computing platform is configured to provide one of a highest or a lowest level of security analysis and a second security zone included within the second computing platform is configured to provide one of a lowest or a highest level of security analysis.

* * * * *